(12) United States Patent
Kotecha et al.

(10) Patent No.: US 8,867,447 B2
(45) Date of Patent: Oct. 21, 2014

(54) DYNAMIC HEADER COMPRESSION BASED ON ATTRIBUTES OF TRAFFIC

(75) Inventors: Lalit R. Kotecha, San Ramon, CA (US); Sagiv Draznin, Walnut Creek, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 239 days.

(21) Appl. No.: 13/596,920

(22) Filed: Aug. 28, 2012

(65) Prior Publication Data

US 2014/0064180 A1 Mar. 6, 2014

(51) Int. Cl.
*H04W 80/04* (2009.01)
*H04L 29/06* (2006.01)
*H04W 4/26* (2009.01)

(52) U.S. Cl.
CPC .............. *H04W 80/04* (2013.01); *H04W 4/26* (2013.01); *H04L 69/22* (2013.01); *H04L 69/04* (2013.01)
USPC ........... 370/328; 370/241; 370/312; 370/331; 370/392

(58) Field of Classification Search
CPC ........... H04W 4/00; H04W 4/06; H04W 4/26; H04W 16/14; H04W 24/00; H04W 48/17; H04W 80/04; H04L 69/04; H04L 69/22

USPC .......................... 370/241, 312, 328, 331, 392
See application file for complete search history.

(56) References Cited

U.S. PATENT DOCUMENTS

| 8,264,958 | B1* | 9/2012 | Pankajakshan | 370/230.1 |
|---|---|---|---|---|
| 2008/0020775 | A1* | 1/2008 | Willars | 455/445 |
| 2008/0056273 | A1* | 3/2008 | Pelletier et al. | 370/395.21 |
| 2010/0135330 | A1* | 6/2010 | Liang et al. | 370/477 |
| 2010/0202458 | A1* | 8/2010 | Sato | 370/392 |
| 2010/0322151 | A1* | 12/2010 | Racz et al. | 370/328 |
| 2011/0273984 | A1* | 11/2011 | Hsu et al. | 370/235 |
| 2012/0093086 | A1* | 4/2012 | Yin et al. | 370/328 |
| 2013/0044708 | A1* | 2/2013 | Kim et al. | 370/329 |
| 2013/0114497 | A1* | 5/2013 | Zhang et al. | 370/312 |

* cited by examiner

*Primary Examiner* — Jeffrey M Rutkowski
*Assistant Examiner* — Rasha Fayed

(57) ABSTRACT

A system may be configured to identify attributes of a bearer channel. Based on the attributes of the bearer channel, the system may identify a header compression policy associated with the bearer channel. The system may be configured to identify, based on attributes of traffic sent and/or received via the bearer channel, and further based on the header compression policy, that header compression should be performed on at least a portion of the traffic associated with the bearer channel. The system may be configured to perform header compression on the at least the portion of the traffic.

20 Claims, 10 Drawing Sheets

400 →

Bearer channel attribute - header compression policy correlation

| Condition | Header compression policy |
|---|---|
| QoS level = QCI 1 | 1 |
| (QoS level = QCI 2) or (UD ID = 12345) | 2 |
| Application ID = "Browser v 1.0" | 3 |
| User device ID = 12346 | 1 |
| User device type = Appel ePhone | 4 |

Header compression policy 1

| Condition | Action |
|---|---|
| (Source port = 800) AND (Destination port = 20) | Compress |
| (Source port range = 1-759) OR (Destination port = 200) | Do not compress |
| Source IP address = 1.2.3.4 | Compress |
| (Destination IP address = 4.3.2.1) AND (QoS level = QCI 2) | Compress |
| Packet size < 1,024 bytes | Compress |
| (Protocol = HTTP) OR (Protocol = RTP) | Compress |

Header compression policy 2

| Condition | Action |
|---|---|
| Source port = 21 | Do not compress |
| Any traffic | Compress |

US 8,867,447 B2

DYNAMIC HEADER COMPRESSION BASED ON ATTRIBUTES OF TRAFFIC

BACKGROUND

Networks often send and receive traffic to and from user devices, such as cellular telephones. Traffic may be transmitted between the networks and the user devices as series of packets. A packet may include a header portion, which may include information such as information identifying a source of the packet, information identifying a destination of the packet, etc., and a payload portion, which may include content associated with the traffic, such as video data, audio data, text data, etc.

BRIEF DESCRIPTION OF THE DRAWINGS

FIGS. 4A-4D illustrate example data structures, according to one or more implementations described herein;

DETAILED DESCRIPTION OF PREFERRED EMBODIMENTS

The following detailed description refers to the accompanying drawings. The same reference numbers in different drawings may identify the same or similar elements.

A system and/or method, described herein, may compress header information associated with traffic, based on one or more header compression policies. A header compression policy may specify attributes of traffic (e.g., attributes of packets associated with traffic), and/or sets of rules regarding attributes of traffic. A system, according to some implementations, may apply header compression to packets associated with the traffic based on these attributes and/or rules. Such attributes may include information regarding, for example, packet size, source and/or destination addresses (and/or a range of addresses), source and/or destination port numbers (and/or a range of port numbers), traffic protocol, payload content type, and/or one or more other packet attributes. In some implementations, a component device of a network may analyze contents of a packet (e.g., may analyze a header and/or a payload of a packet) in order to identify, based on a header compression policy, whether to apply header compression to the packet and/or to other packets associated with a bearer channel on which the packet is transmitted.

In some implementations, a system may analyze attributes associated with a bearer channel (e.g., user device identifier, user device type, quality of service ("QoS") level, application identifier, etc.) in order to determine whether to identify a header compression policy associated with the bearer channel. That is, in some such implementations, different bearer channels with different attributes may be associated with different header compression policies (e.g., different sets of rules), based on which a component device of a network may analyze contents of a packet in order to identify whether to apply header compression to packets associated with each respective bearer channel.

By performing header compression based on contents of a packet, one or more implementations may allow more dynamic header compression policies than existing techniques which may not perform header compression based on contents of a packet. Such policy-based header compression may allow a network service provider to finely tune header compression policies, which may result in reduced resource consumption (e.g., network bandwidth and/or processing power), which may yield a lower overall cost of network operation.

Figure 1:
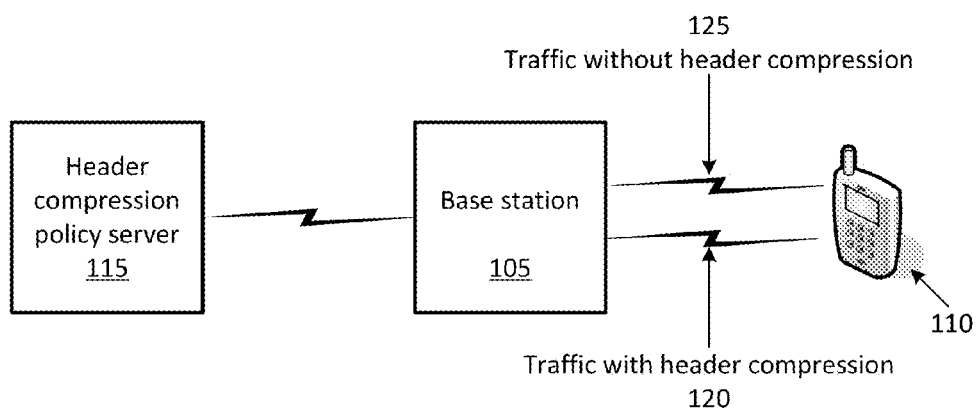
FIG. 1 illustrates an overview of one or more example implementations described herein.

FIG. 1 illustrates an overview of one or more example implementations described herein. As shown in FIG. 1, a component of a network, such as base station 105 of a cellular telecommunications network, may be in communication with user device 110. That is, base station 105 may send and/or receive traffic to and/or from user device 110 via, for example, an air interface. Base station 105 and user device 110 may communicate via one or more logical channels, also referred to as bearer channels. Each bearer channel may correspond to one or more applications associated with user device 110. For example, one bearer channel may be associated with a streaming video application, while another bearer channel may be associated with an Internet browser application. Base station 105 and/or user device 110 may, in some implementations, perform header compression on packets sent or received via a particular bearer channel, based on attributes of traffic associated with the particular bearer channel.

For example, base station 105 and/or user device 110 may receive information from header compression policy server 115, specifying one or more header compression policies, based on which base station 105 and/or user device 110 may perform header compression. A particular header compression policy may include information regarding one or more rules that identify attributes of traffic for which base station 105 and/or user device 110 should perform header compression. For example, one header compression policy may indicate that header compression should be performed on traffic with a packet size of less than 100 bytes.

In some implementations, header compression policy server 115 may store multiple header compression policies, each header compression policy being associated with bearer channels having particular attributes. For example, header compression policy server 115 may store one header compression policy for bearer channels that are associated with a streaming video application, and may store a different header compression policy for bearer channels that are associated with an Internet browser application.

In some implementations, base station 105 and/or user device 110 may receive header compression policy information, for a particular bearer channel, in connection with the establishment of the particular bearer channel. For instance, assume that user device 110 sends a request to base station 105 to establish a new bearer channel between base station 105 and user device 110. Further, assume that this request is associated with a streaming video application.

In some implementations, header compression policy server 115 may receive the request, and/or information associated with the requested bearer channel. Header compression policy server 115 may, in some implementations, identify a set of attributes associated with the request and/or the requested bearer channel (e.g., an attribute indicating that the requested bearer channel is associated with a streaming video application). Based on the identified set of bearer channel attributes, header compression policy server 115 may identify a header compression policy associated with the requested bearer channel, and may, in some implementations, provide information regarding the identified header compression policy to base station 105 and/or user device 110.

When establishing the bearer channel between base station 105 and user device 110, base station 105 may store information identifying that the header compression policy is associated with the bearer channel. Additionally, or alternatively, base station 105 may provide information to user device 110 identifying that the header compression policy is associated with the bearer channel.

In some implementations, base station 105 and/or user device 110 may perform header compression on traffic, based on one or more header compression policies. For example, as shown in FIG. 1, base station 105 and/or user device 110 may perform header compression on traffic 120, which may be associated with, for example, the streaming video application. In some implementations, attributes of traffic 120 may also match conditions specified in a header compression policy associated with the established bearer channel associated with the streaming video application (e.g., packets associated with traffic 120 may be less than 100 bytes in size). As also shown in FIG. 1, base station 105 may forgo performing header compression on traffic 125, which may be traffic that does not satisfy a header compression policy.

Figure 2:
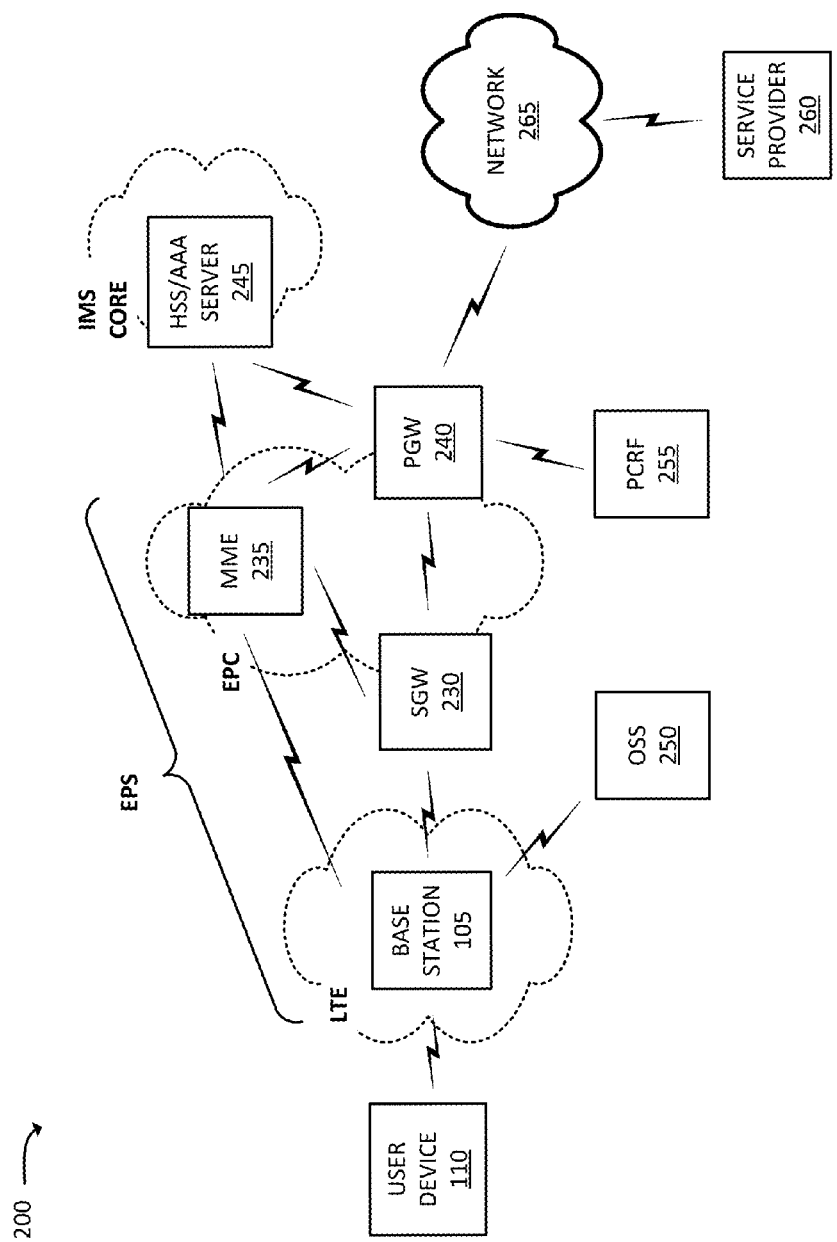
FIG. 2 illustrates an example system in which systems and/or methods, described herein, may be implemented.

FIG. 2 illustrates an example environment 200, in which systems and/or methods described herein may be implemented. As shown in FIG. 2, environment 200 may include user device 110, base station 105, serving gateway ("SGW") 230, mobility management entity device ("MME") 235, packet data network ("PDN") gateway ("PGW") 240, home subscriber server ("HSS")/authentication, authorization, accounting ("AAA") server 245 (hereinafter referred to as "HSS/AAA server 245"), operations support system ("OSS") 250, policy charging and rules function ("PCRF") 255, service provider 260, and network 265.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 105, some or all of which, take the form of an eNodeB ("eNB"), via which user device 110 may communicate with the EPC network. The EPC network may include one or more SGWs 230, MMEs 235, and/or PGWs 240, and may enable user device 110 to communicate with network 265 and/or an Internet protocol ("IP") multimedia subsystem ("IMS") core network. The IMS core network may include HSS/AAA server 245, and may manage authentication, session initiation, account information, a user profile, etc. associated with user device 110.

User device 110 may include any computation and communication device, such as a wireless mobile communication device that is capable of communicating with base station 105 and/or network 265. For example, user device 110 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 110 may send traffic to and/or receive traffic from network 265 via signal bearers, such as base station 105, SGW 230, and/or PGW 240.

Base station 105 may include one or more network devices that receive, process, and/or transmit traffic, such as calls, audio, video, text, and/or other data, destined for and/or received from user device 110. In one example, base station 105 may be an eNB device and may be part of the LTE network. Additionally, or alternatively, one or more other base stations 105 may be associated with a RAN that is not associated with the LTE network (e.g., a wireless hot spot, a wireless access point, etc.). Base station 105 may receive traffic from and/or send traffic to network 265 via SGW 230 and PGW 240. Base station 105 may send traffic to and/or receive traffic from user device 110 via an air interface.

SGW 230 may include one or more network devices that gather, process, search, store, and/or provide information in a manner described herein. For example, SGW 230 may include a gateway, a router, a modem, a switch, a firewall, a network interface card ("NIC"), a hub, a bridge, a proxy server, an optical add-drop multiplexer ("OADM"), or some other type of device that processes and/or transfers traffic. SGW 230 may, for example, aggregate traffic received from one or more base stations 105 and may send the aggregated traffic to network 265 via PGW 240.

MME 235 may include one or more computation and communication devices that gather, process, search, store, and/or provide information in a manner described herein. For example, MME 235 may perform operations to register user device 110 with the EPS, to establish bearer channels associated with a session with user device 110, to handoff user device 110 from the EPS to another network, to handoff user device 110 from the other network to the EPS, and/or to perform other operations. MME 235 may perform policing operations on traffic destined for and/or received from user device 110.

PGW 240 may include one or more network devices, or other types of computation and communication devices, that gather, process, search, store, and/or provide information in a manner described herein. For example, PGW 240 may include a gateway, a router, a modem, a switch, a firewall, a NIC, a hub, a bridge, a proxy server, an OADM, or some other type of device that processes and/or transfers traffic. PGW 240 may aggregate traffic received from one or more SGWs 230, etc. and may send the aggregated traffic to network 265. PGW 240 may also, or alternatively, receive traffic from network 265 and may send the traffic toward user device 110 via SGW 230 and/or base station 105.

HSS/AAA server 245 may include one or more server devices, or other types of devices, that gather, process, search, store, and/or provide information. For example, HSS/AAA server 245 may manage, update, and/or store, in a memory associated with HSS/AAA server 245, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 110 and/or one or more other user devices 110. Additionally, or alternatively, HSS/AAA server 245 may perform authentication, authorization, and/or accounting operations associated with the subscriber and/or a communication session with user device 110.

OSS 250 may include one or more server devices, or other types of devices, that support processes such as maintaining network inventory, provisioning services, configuring network components, and managing faults. In some implementations, OSS 250 may receive information regarding header compression policies, e.g., from one or more users (such as, for example, an administrator associated with OSS 250). In some such implementations, OSS 250 may provide some or all of this information regarding header compression policies, and/or other information, to base station 105.

PCRF 255 may include one or more server devices, or other types of devices, that aggregates information to and from the EPC network, OSS 250, and/or other sources. PCRF 255 may receive information regarding policies (e.g., a header compression policy) and/or subscriptions from one or more sources, such as subscriber databases and/or from one or more users (such as, for example, an administrator associated with PCRF 255).

In some implementations, OSS 250 and/or PCRF 255 may correspond to some or all of the functionality described above with respect to header compression policy server 115. That is, in some implementations, OSS 250 and/or PCRF 255 may include one or more server devices that store and/or output information regarding header compression policies. In some implementations, some or all of the functionality of header compression policy server 115 may be implemented by base station 105.

Service provider 260 may include one or more server devices, or other types of computation and communication devices, that provide content. For example, service provider 260 may host a website that can be accessed, by user device 110, to receive a service. The service may, for example, correspond to content (e.g., applications, web pages, video, audio, images, games, advertising content, text, data, and/or some combination thereof), a messaging service (e.g., email, instant message, etc.), a banking service, an electronic sales transaction service, etc. Service provider 260 may provide the content and/or service to user device 110 when application server 265 indicates that a subscriber, of user device 110, is authenticated.

Network 265 may include one or more wired and/or wireless networks. For example, network 265 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 265 may include a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Figure 3A:
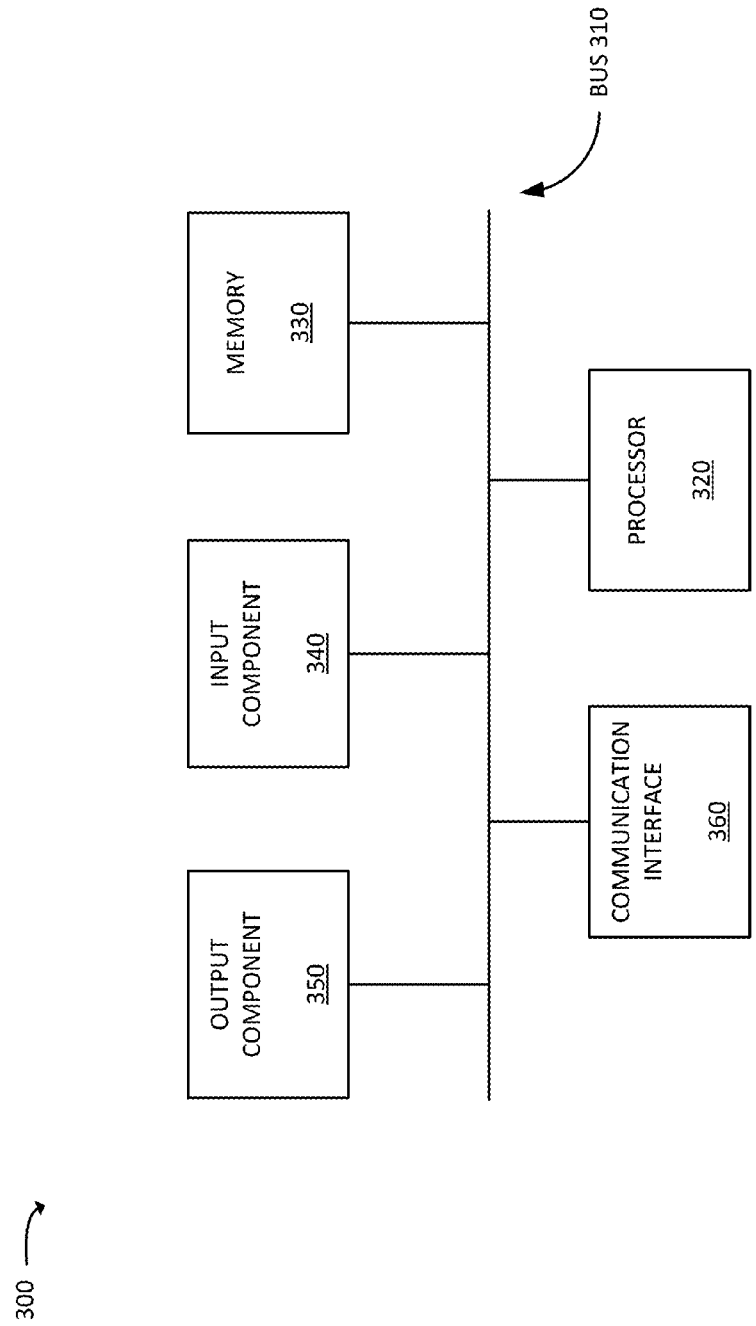
FIGS. 3A and 3B illustrate example components of one or more devices shown in FIG. 2.

FIG. 3A is a diagram of example components of device 300. In some implementations, device 300 may correspond to, for example, base station 105, user device 110, header compression policy server 115, SGW 230, MME 235, PGW 240, HSS/AAA server 245, OSS 250, and/or PCRF 255. Device 300 may include bus 310, processor 320, memory 330, input component 340, output component 350, and communication interface 360. In another implementation, device 300 may include additional, fewer, different, or differently arranged components.

Bus 310 may include one or more communication paths that permit communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes ("LEDs"), etc.

Communication interface 360 may include any transceiver-like mechanism that enables device 300 to communicate with other devices and/or systems. For example, communication interface 360 may include an Ethernet interface, an optical interface, a coaxial interface, or the like. Communication interface 360 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 300 may include more than one communication interface 360. For instance, device 300 may include an optical interface and an Ethernet interface.

As will be described in detail below, device 300 may perform certain operations relating to dynamic header compression. Device 300 may perform these operations in response to processor 320 executing software instructions stored in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions stored in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 3B:
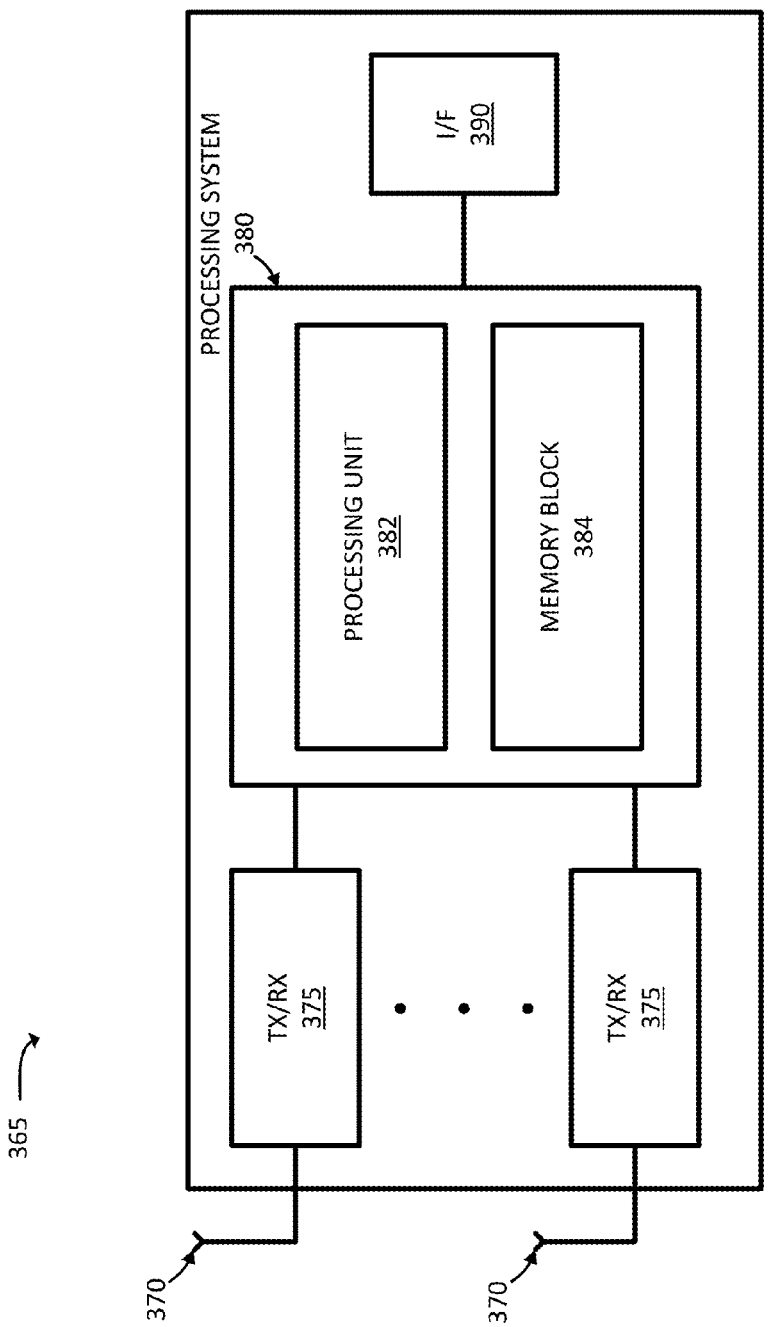

FIG. 3B illustrates example components of device 365 according to one or more implementations described herein. In some implementations, device 365 may correspond to, for example, base station 105. As shown in FIG. 3B, base station 105 may include antennas 370, transceivers ("TX/RX") 375, a processing system 380, and an interface ("I/F") 390. Device 365 may include fewer components, additional components, different components, and/or differently arranged components than those illustrated in FIG. 3B. Additionally, or alternatively, one or more operations described as being performed by a particular component of device 365 may be performed by one or more other components, in addition to or instead of the particular component of device 365.

Antennas 370 may include one or more directional and/or omnidirectional antennas. Transceivers 375 may be associated with antennas 370 and include transceiver circuitry for transmitting and/or receiving traffic within a network, such as a wireless network, via antennas 370.

Processing system 380 may control the operation of device 365. Processing system 380 may also process information received via transceivers 375 and interface 390. Processing system 380 may further measure quality and strength of a connection and determine a frame error rate ("FER"), and transmit this information to MME 140 and/or some other device. As illustrated, processing system 380 may include a processing unit 382 and a memory block 384. Alternatively, or additionally, processing system 380 may include fewer components, additional components, different components, and/or differently arranged components than illustrated in FIG. 3B.

Processing unit 382 may include one or more processors, microprocessors, etc., and may process information received via transceivers 375 and interface 390. The processing may include, for example, data conversion, forward error correction ("FEC"), rate adaptation, Wideband Code Division Multiple Access ("WCDMA") spreading/dispreading, quadrature phase shift keying ("QPSK") modulation, etc. In addition, processing unit 382 may generate control messages and/or data messages and cause those control messages and/or data messages to be transmitted via transceivers 375 and/or interface 390. Processing unit 382 may also process control messages and/or data messages received from transceivers 375 and/or interface 390.

Memory block 384 may include any type of dynamic storage device that may store information and instructions, for execution by processing unit 382, and/or any type of non-volatile storage device that may store information for use by processing unit 382. Interface 390 may include one or more input/output components that allow device 365 to transmit data to and receive data from SGW 230, MME 235, OSS 250, etc.

FIGS. 4A-4D illustrate example data structures 400, 412, 426, and 432. In some implementations, data structures 400, 412, 426, and/or 432 may be stored by, for example, header compression policy server 115, base station 105, and/or by some other device. Data structure 400, shown in FIG. 4A, may correlate attributes of bearer channels to header compression policies. As described below with respect to FIG. 5, header compression policy server 115, base station 105, and/or some other device may receive information regarding attributes of a bearer channel (e.g., during establishment of a bearer channel), and may use the information stored in data structure 400 to identify a header compression policy associated with the bearer channel, based on the attributes of the bearer channel.

As shown in FIG. 4A, example data structure 400 may be conceptually represented as a table with a set of rows 402-410, and a set of columns. One column may include sets of conditions relating to bearer channel attributes, and one column may indicate a header compression policy associated with bearer channels that match the conditions.

For instance, as shown in FIG. 4A, row 402 of data structure 400 may indicate a condition of "QoS level=QCI 1," and an identification of header compression policy "1." Thus, in this example, the information in row 402 may denote that a bearer channel, which is associated with a QoS Class Identifier ("QCI") of "1," is associated with a header compression policy with an identifier of "1." An example of header compression policy 1 is described below with respect to FIG. 4B.

Figures 4C, 4D:
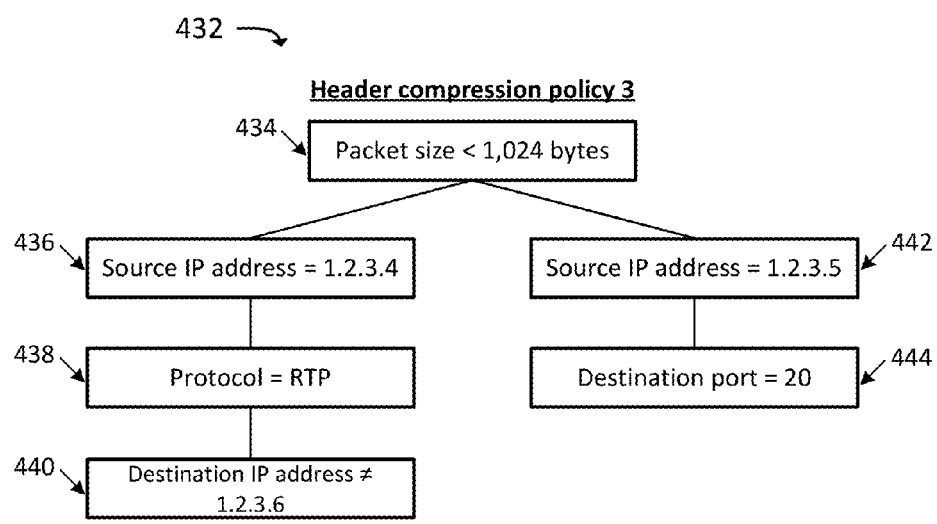

As another example, row 404 of data structure 400 may indicate a condition of "(QoS level=QCI 2) or (UD ID=12345)," and an identification of header compression policy "2." Thus, in this example, the information in row 404 may denote that a bearer channel, which is associated with a QCI of "2" or is associated with a user device ("UD") with an identifier (e.g., a Subscriber Identity Module ("SIM") number, an International Mobile Subscriber Identity ("IMSI") number, an International Mobile Equipment Identity ("IMEI") number, or some other user device identifier) of "12345," is associated with a header compression policy with an identifier of "2." An example of header compression policy 2 is described below with respect to FIG. 4C.

In some implementations, when using data structure 400 to identify a header compression policy associated with a bearer channel, header compression policy server 115 may use the information stored in data structure 400 in a sequential manner. For example, when identifying a header compression policy for a particular bearer channel, header compression policy server 115 may first identify whether the condition specified in row 402 matches attributes of the particular bearer channel before identifying whether the condition specified in row 404 matches attributes of the particular bearer channel, whether the condition specified in row 404 matches attributes of the particular bearer channel before identifying whether the condition specified in row 406 matches attributes of the particular bearer channel, etc.

For example, assume that header compression policy server 115 receives information regarding a bearer channel request that is associated with a QoS level of QCI 1, and a user device identifier of "12345." Further assume, in this example, that header compression policy server 115 uses the information stored in data structure 400 in a sequential manner. In this example, header compression policy server 115 may identify that this bearer channel is associated with header compression policy 1 (i.e., the header compression policy associated with row 402), even though the conditions specified in rows 402 and 404 are both true.

In some situations where header compression policy server 115 sequentially evaluates bear channel attributes, as described above, attributes of a bearer channel may not match any conditions stored in data structure 400. In some implementations, header compression policy server 115 may identify that no header compression policy is associated with such a bearer channel.

FIGS. 4B-4D illustrate example data structures 412, 426, and 432, which may, in some implementations, correspond to header compression policies. In some implementations, a header compression policy (e.g., information stored by data structures 412, 426, and/or 432) may include information identifying conditions regarding attributes of traffic, and actions to take when the conditions are met (e.g., perform header compression on traffic for which attributes meet the specified conditions). As described below with respect to FIG. 5, base station 105 may use the information included in data structures 412, 426, and/or 432 to identify traffic for which header compression should be performed, according to one or more implementations.

Example data structure 412, shown in FIG. 4B, may correspond to header compression policy 1, mentioned above with respect to FIG. 4A. As shown in FIG. 4B, example data structure 412 may be conceptually represented as a table with a set of rows 414-424, and a set of columns. One column may include sets of conditions, and one column may include actions to take when respective conditions are met. In this example, each of rows 414-424 may identify an action to take (e.g., "Compress" or "Do not compress") for traffic that matches a respective condition regarding traffic attributes. For example, as shown in FIG. 4B, row 414 may indicate a condition of "(Source port=800) AND (Destination port=20)," and an action of "Compress." Thus, in this example, the information in row 414 may denote that header compression should be performed on traffic (e.g., one or more packets) that is associated with a source port of 800 and a destination port of 20.

Referring back to FIG. 4A, assume that header compression policy server 115 receives information regarding a bearer channel that is associated with a QoS level of QCI 1. In this example, based on the information stored in data structure 400, header compression policy server 115 may identify that header compression policy 1 (e.g., the information stored in data structure 412) is associated with the bearer channel. Header compression policy server 115 may provide information to base station 105 and/or user device 110 (e.g., as a part of a bearer establishment procedure), indicating that header compression policy 1 is associated with this bearer channel.

In one example, base station 105 may identify traffic, associated with the bearer channel, that matches the condition specified in row 414. Based on identifying that the traffic matches the specified condition, and based on the "action" column of row 414, indicating that header compression should be performed on traffic that matches the specified condition, base station 105 may identify that header compression should be performed on this traffic. Based on identifying that header compression should be performed on this traffic, base station 105 may, in some implementations, perform one or more header compression techniques on this traffic, and/or on other traffic associated with this traffic (e.g., may perform header compression on a particular analyzed packet, and/or may perform header compression on other packets associated with a bearer channel via which a particular analyzed packet was sent or received).

As another example, row 416 of data structure 412 may indicate a condition of "(Source port range=1-759) OR (Destination port=200)," and an action of "Do not compress." Thus, in this example, the information in row 416 may denote that header compression should not be performed on traffic (e.g., one or more packets) that is associated with a source port that is in a range between 1 and 759, or is associated with a destination port of 200. As described below, in some implementations, conditions for traffic on which header compression should not be performed may be useful in some scenarios (e.g., when defining attributes for traffic that header compression would otherwise be performed on, as may be specified by one or more other rules—in other words, exceptions to the one or more other rules).

As yet another example, row 418 of data structure 412 may indicate that header compression should be performed on traffic associated with a destination IP address of 1.2.3.4. As a further example, row 420 may indicate that header compression should be performed on traffic associated with a destination IP address of 4.3.2.1 and a QoS level of QCI 2. As another example, row 422 may indicate that header compression should be performed on traffic associated with a packet size of less than 1,024 bytes. As yet another example, row 424 may indicate that header compression should be performed on traffic associated with a Hypertext Transfer Protocol ("HTTP"), or a Real-time Transport Protocol ("RTP").

In some implementations, when using data structure 412 to evaluate whether header compression should be performed on traffic, base station 105 may use the information stored in data structure 412 in a sequential manner, as similarly described above with respect to data structure 412. For example, assume that the traffic identified by base station 105 is associated with a source port of 800, a destination port of 10, and a source IP address of 1.2.3.4.

In this example, base station 105 may identify that since the attributes of the traffic do not match the condition associated with row 414 of data structure 412 (i.e., the destination port is not 20, therefore the attributes of the traffic do not match the condition associated with row 414), base station 105 may evaluate the next condition listed in data structure 412 to the attributes of the traffic. That is, in this example, base station 105 may identify that the attributes of the traffic do not match the condition associated with row 416 (i.e., the source port is not within the range of 1 through 759, and the destination port is not 200). Therefore, base station 105 may compare the next condition listed in data structure 412 to the attributes of the traffic. That is, in this example, base station 105 may identify that the attributes of the traffic match the condition associated with row 418 (i.e., the source IP address is 1.2.3.4). Based on identifying that the attributes of the traffic match the condition associated with row 418, base station 105 may identify that header compression should be performed on the traffic.

In some such implementations, upon identifying a condition that matches attributes of traffic, base station 105 may forgo determining whether the attributes of traffic match other conditions (e.g., conditions that have not yet been evaluated, and/or conditions that are listed after the matching condition). For instance, continuing with the above example, upon identifying that the condition associated with row 418 matches the attributes of the traffic, base station 105 may forgo determining whether conditions associated with one or more of rows 422 and 424 are applicable to the example traffic.

In some situations where base station 105 sequentially evaluates traffic attributes, as described above, attributes of traffic may not match any conditions stored in data structure 412. In some implementations, base station 105 may forgo performing header compression on such traffic.

In some implementations, base station 105 may evaluate attributes of traffic to determine whether the attributes of the traffic match multiple conditions. For example, in some such implementations, base station 105 may determine that header compression is to be performed on traffic when two or more conditions (for which the action is "Compress"), indicated by data structure 412, match attributes of the traffic.

In some implementations, base station 105 may determine that header compression is not to be performed on traffic when at least one rule, for which the action is "Do not compress," is applicable to the traffic. For example, assume that base station 105 identifies traffic, for which attributes of the traffic match the conditions indicated in rows 416-424. Further assume that base station 105 is configured to determine that header compression is to be performed on traffic, for which attributes of the traffic match two or more conditions that are associated with an action of "Compress." In this example, and in some implementations, base station 105 may identify that header compression is not to be performed on the traffic, based on determining that the condition indicated by row 416, which has an associated action of "Do not compress," matches the attributes of the traffic (even though two or more conditions that are associated with an action of "Compress" match the attributes of the traffic). In this sense, conditions with an associated action of "Do not compress" may be considered to be exceptions to conditions that would otherwise indicate that header compression should be performed on such traffic.

Example data structure 426, shown in FIG. 4C, may correspond to header compression policy 2, mentioned above with respect to FIG. 4A. As shown in FIG. 4C, example data structure 426 may be conceptually represented as a table with a set of rows 428 and 430, and a set of columns. One column may include sets of conditions, and one column may include actions to take when respective conditions are met.

For example, as shown in FIG. 4C, row 428 may indicate a condition of "Source port=21," and an action of "Do not compress." Thus, in this example, the information in row 428 may denote that header compression should not be performed on traffic that is associated with a source port of 21. As also shown in FIG. 4C, row 430 may indicate an always true condition (e.g., "any traffic"), and an action of "Compress." Thus, if evaluated in a sequential manner (i.e., the condition in row 428 before the condition in row 430), the header compression policy denoted by data structure 426 may indicate that header compression should be performed on all traffic, other than traffic associated with a source port of 21. Another possible way of denoting this header compression policy would be a single row with the condition "Source port≠21," and a condition of "Compress."

While examples of data structures 400, 412, and 426 were described above (e.g., data structures in which attributes may be sequentially evaluated), other data structures and/or techniques of evaluating traffic to determine whether header compression is to be performed may be used. For example, FIG. 4D illustrates another example data structure 432 that may be stored in lieu of, or in addition to, data structures 400, 412, or 426. Data structure 432 may represent a hierarchical set of conditions associated with traffic attributes, based on which base station 105 may determine whether header compression is to be performed on traffic. Data structure 432 my correspond to, for example, header compression policy 3, which is shown in FIG. 4A.

Data structure 432 may include a set of nodes 434-444. Each node may correspond to, for example, a condition associated with attributes of traffic. Base station 105 may, in some implementations, evaluate the conditions specified by respective nodes 434-444 to determine whether to apply header compression to traffic.

For example, referring to FIG. 4D, base station 105 may evaluate particular traffic based on node 434. For instance, base station 105 may identify whether one or more packets, associated with the particular traffic, are less than 1024 bytes in size. If base station 105 identifies that the particular traffic is associated with packets that are not less than 1024 bytes in size, base station 105 may determine that header compression is not to be performed on the particular traffic. If, on the other hand, the traffic is associated with packets that are less than 1024 bytes in size (i.e., if the condition indicated by node 445 matches attributes of the particular traffic), then base station 105 may evaluate the traffic based on the other conditions indicated by data structure 432.

For instance, base station 105 may evaluate whether the condition indicated by node 436 matches the attributes of the particular traffic. That is, base station 105 may identify whether a source IP address associated with the traffic is 1.2.3.4. Assume, for example, that base station 105 identifies that the source IP address associated with the traffic is 1.2.3.4. Based on identifying that the source IP address of the traffic is 1.2.3.4 (i.e., that the condition indicated by node 436 matches attributes of the particular traffic), base station 105 may evaluate whether the condition indicated by node 438 matches attributes of the particular traffic.

That is, in this example, base station 105 may identify whether a protocol associated with the traffic is RTP. If the protocol associated with the traffic is not RTP, base station 105 may identify that header compression should not be performed on the traffic, and/or may forgo performing header compression on the traffic. If, on the other hand, the protocol associated with the traffic is RTP, base station 105 may evaluate whether the condition indicated by node 440 matches the attributes of the particular traffic. That is, base station 105 may identify whether a destination IP address associated with the traffic is 1.2.3.6. If the destination IP address is not 1.2.3.6, base station 105 may identify that header compression should be performed on the traffic. If, on the other hand, the destination IP address is 1.2.3.6, base station 105 may identify that header compression should not be the performed on the traffic, and/or may forgo performing header compression on the traffic.

While FIGS. 4A-4D illustrate some examples of data structures that may be implemented by, for example, base station 105 and/or header compression policy server 115, in some implementations, additional and/or different data structures than the examples shown above may be used. For example, in some implementations, data structures may include linked lists, hash tables, arrays, trees, and/or other types of data structures. Furthermore, in some implementations, such data structures may store less, more, or different information than is shown in example data structures 400, 412, 426, and/or 432. Additionally, while an example of packet size is discussed above, in some implementations, packet size may refer to a size of a packet including one or more headers, while in some implementations, packet size may refer to a size of a payload of a packet, without one or more headers associated with the packet.

Furthermore, while examples of orders in which conditions may be evaluated, based on information stored in data structures 400, 412, 426, and/or 432, are presented above, in practice, such conditions may be evaluated based on a different order than described above. For example, in some implementations, base station 105 may start by evaluating conditions listed at the bottom of data structure 412 (e.g., a condition associated with row 424), and may evaluate the conditions in an ascending order (e.g., row 424, then row 422, then row 420, etc.). In some implementations, base station 105 may evaluate the conditions in any other order, such as a random order, or may evaluate the conditions in parallel. As another example, while data structure 432 was described above as being evaluated in a node-left-right order, base station 105 may, in some implementations, evaluate data structure 432 in any other order, such as left-node-right order, node-right-left order, right-node-left order, and/or any other order.

Figure 5:
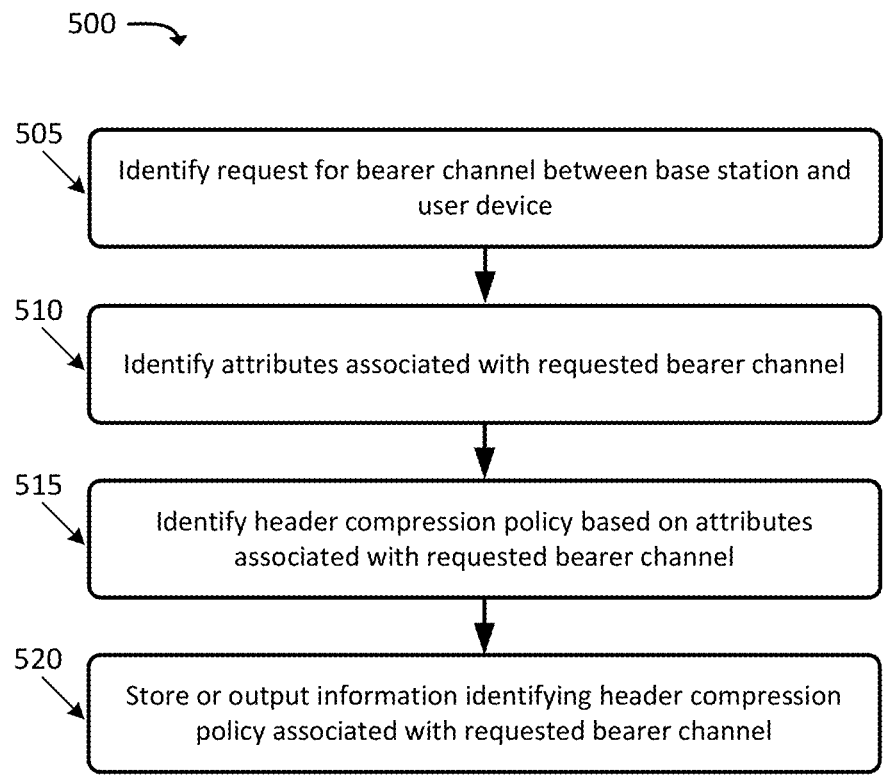
FIG. 5 illustrates an example process for identifying a header compression policy for a bearer channel based on attributes of the bearer channel, according to one or more implementations described herein.

FIG. 5 illustrates an example process 500 for identifying a header compression policy for a bearer channel based on attributes of the bearer channel. In one example implementation, process 500 may be performed by header compression policy server 115. In another example implementation, some or all of process 500 may be performed by a device or collection of devices separate from, or in combination with, header compression policy server 115. As mentioned above, in some implementations, some or all of the functionality of header compression policy server 115 may be implemented by base station 105, OSS 250, and/or PCRF 255.

Process 500 may include identifying a request for a bearer channel between a base station and a user device (block 505). For example, in some implementations, header compression policy server 115 may receive information identifying that a bearer channel between base station 105 and user device 110 has been requested. The information may correspond to, for example, a bearer channel establishment request sent by user device 110 to base station 105. In some implementations, header compression policy server 115 may receive this information via one or more devices that are in a network path between user device 110 and header compression policy server 115 (e.g., base station 105, SGW 230, PGW 240, and/or another device).

In some implementations, a bearer channel establishment process between base station 105 and user device 110 may occur when user device 110 enters a physical range associated with base station 105. Additionally, or alternatively, a bearer channel establishment process may occur when user device 110 attempts to output data to a network via base station 105, and/or when data is to be sent from a network to user device 110 via base station 105. In some implementations, multiple bearer channels may be able to concurrently be present between base station 105 and user device 110.

Assume, for instance, that user device 110 initiates an application, for which traffic may be sent and/or received to and/or from a network via base station 105. In this scenario, user device 110 may send a bearer channel request, for a bearer channel that facilitates the transmission of traffic associated with the application between base station 105 and user device 110.

Process 500 may also include identifying attributes associated with the requested bearer channel (block 510). For instance, header compression policy server 115 may identify attributes associated with a bearer channel request. In some implementations, the bearer channel request may include information identifying such attributes. In some implementations, header compression policy server 115 may receive information, in addition to the bearer channel request, that identifies attributes of the requested bearer channel. Such attributes may include information regarding, for example, a QoS level associated with the requested bearer channel, a user device identifier associated with the requested bearer channel (e.g., a user device name, a SIM number, an IMEI number, an IMSI number, or another identifier), an identification of an application associated with the bearer channel request, a type of user device 110 (e.g., a make and/or model of user device 110), and/or other information associated with the requested bearer channel.

Process 500 may additionally include identifying a header compression policy based on attributes associated with the requested bearer channel (block 515). For example, as described above with respect to FIG. 4A, header compression policy server 115 may store and/or receive information that associates conditions, regarding bearer channel attributes, with header compression policies. An example of such information, according to some implementations, is represented in data structure 400, shown in FIG. 4A. In some implementations, header compression policy server 115 may identify a header compression policy by comparing bearer channel attributes (identified at block 510) to the information that associates conditions, regarding bearer channel attributes, with header compression policies.

Process 500 may further include storing or outputting information identifying the header compression policy that is associated with the requested bearer channel (block 520). For example, header compression policy server 115 may store information identifying that the requested bearer channel is associated with the header compression policy identified at block 515. Additionally, or alternatively, header compression policy server 115 may output (e.g., to base station 105 and/or to user device 110) information identifying that the requested bearer channel is associated with the header compression policy identified at block 515. As described further below with respect to FIG. 8, base station 105 and/or user device 110 may use the information regarding the header compression policy to determine whether to perform header compression on traffic, associated with the bearer channel.

Figure 6:
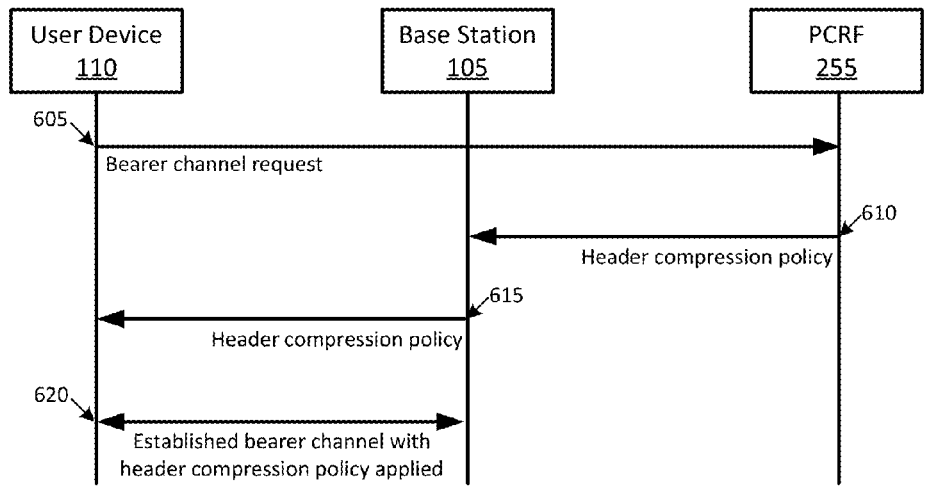
FIGS. 6 and 7 illustrate an example of identifying a header compression policy for a bearer channel based on attributes of the bearer channel, according to one or more implementations described herein.
Figure 7:
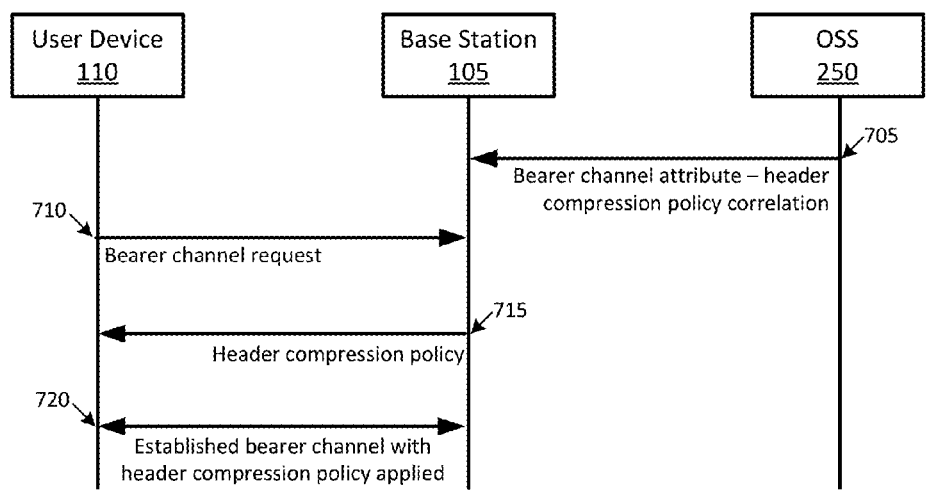

FIGS. 6 and 7 illustrate an example of identifying a header compression policy for a bearer channel based on attributes of the bearer channel. For example, each of FIGS. 6 and 7 may correspond to one or more implementations of process 500.

In the example implementation illustrated in FIG. 6, functionality of header compression policy server 115 may be implemented by PCRF 255. At 605, PCRF 255 may receive information regarding a request for a bearer channel between user device 110 and base station 105. PCRF 255 may receive this information from user device 110 and/or base station 105 (e.g., directly, or through one or more intervening devices, such as SGW 230 and/or PGW 240).

As described above with respect to blocks 510 and 515 of FIG. 5, PCRF 255 may identify a header compression policy associated with the requested bearer channel based on attributes of the requested bearer channel (e.g., a QoS level associated with the requested bearer channel, a user device identifier associated with the requested bearer channel, an identification of an application associated with the bearer channel request, a type of user device 110, etc.).

At 610, PCRF 255 may provide information regarding the header compression policy (e.g., conditions regarding attributes of traffic, and whether to perform header compression based on these conditions) to base station 105. Base station 105 may, in some implementations, store the information regarding the header compression policy. At 615, base station 105 may provide information regarding the header compression policy to user device 110.

At 620, a bearer channel may be established between base station 105 and user device 110. Base station 105 and user device 110 may transmit traffic to and/or from each other via this bearer channel. As described below with respect to FIG. 8, base station 105 and/or user device 110 may perform header compression on some or all of this traffic based on the header compression policy associated with the bearer channel, and based on identifying attributes of the traffic.

In the example implementation illustrated in FIG. 7, functionality of header compression policy server 115 may be implemented by OSS 250 and/or base station 105. At 705, base station 105 may receive information that correlates conditions regarding bearer channel attributes to header policies. In some implementations, this information may be similar to the information described above with respect to data structure 400 of FIG. 4A. In some implementations, base station 105 may receive this information from OSS 250, as shown in FIG. 7. In some implementations, base station 105 may receive this information from one or more other sources, such as one or more other devices, and/or from a user.

At 710, base station 105 may receive information regarding a request for a bearer channel between user device 110 and base station 105. As described above with respect to blocks 510 and 515 of FIG. 5, base station 105 may identify a header compression policy associated with the requested bearer channel based on attributes of the requested bearer channel (e.g., a QoS level associated with the requested bearer channel, a user device identifier associated with the requested bearer channel, an identification of an application associated with the bearer channel request, a type of user device 110, etc.). In some implementations, base station may identify the header compression policy further based on the information received at 705.

At 715, base station 105 may provide information regarding the header compression policy (e.g., conditions regarding attributes of traffic, and whether to perform header compression based on these conditions) to user device 110. At 720, a bearer channel may be established between base station 105 and user device 110. Base station 105 and user device 110 may transmit traffic to and/or from each other via this bearer channel. As described below with respect to FIG. 8, base station 105 and/or user device 110 may perform header compression on some or all of this traffic based on the header compression policy associated with the bearer channel, and based on identifying attributes of the traffic.

While examples of a header compression policy associated with one bearer channel between one base station 105 and one user device 110 were described above with respect to FIGS. 6 and 7, some implementations may allow for multiple header compression policies for multiple bearer channels. For example, assume that two bearer channels are established between user device 110 and base station 105. One of the bearer channels may be associated with one header compression policy, and the other one of the bearer channels may be associated with a different header compression policy (or no header compression policy).

As another example, assume that a first bearer channel is established between a first user device 110 and base station 105, and that a second bearer channel is established between a second user device 110 and base station 105. In this example, the first bearer channel may be associated with a first header compression policy, and the second bearer channel may be associated with a different second header compression policy (or no header compression policy).

Figure 8:
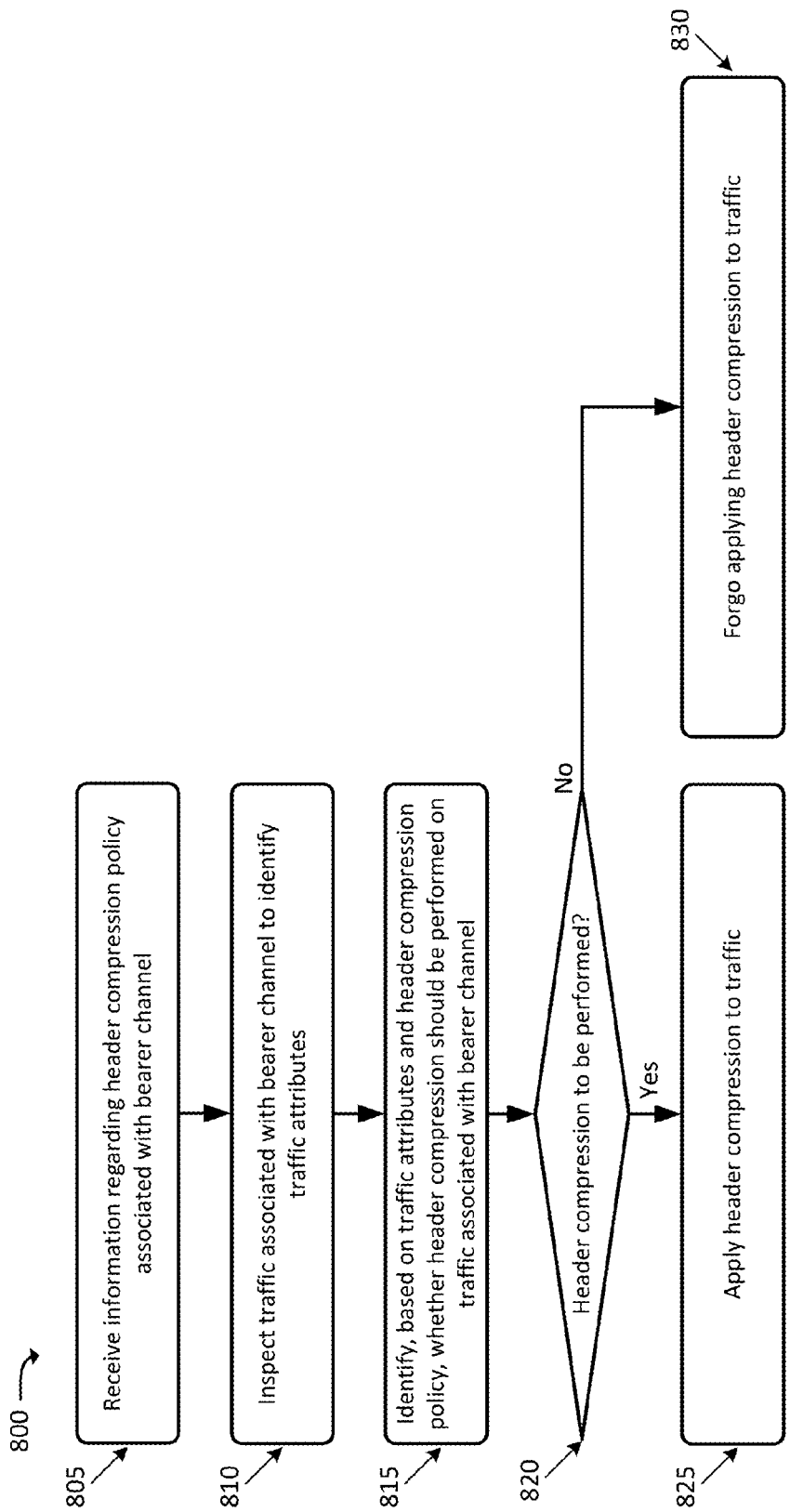
FIG. 8 illustrates an example process for applying header compression based on traffic attributes, according to one or more implementations described herein.

FIG. 8 illustrates an example process for applying header compression based on traffic attributes. In one example implementation, process 800 may be performed by base station 105 and/or user device 110. In another example implementation, some or all of process 500 may be performed by a device or collection of devices separate from, or in combination with, base station 105 and/or user device 110. While process 800 may be performed by base station 105 and/or user device 110, for the sake of brevity of explanation, examples are given below in the context of base station 105 performing process 800.

Process 800 may include receiving information regarding a header compression policy associated with a bearer channel (block 805). For example, base station 105 may receive header compression policy information from header compression policy server 115. In some implementations, this header compression policy information may correspond to the information outputted by header compression policy server 115 at block 520 of FIG. 5. Additionally, or alternatively, base station 105 may receive header compression policy information from one or more other sources, such as from a user (e.g., an administrator associated with base station 105). In some implementations, base station 105 may receive header compression policy information upon the establishment of the bearer channel. In some implementations, base station 105 may receive the header compression policy at some other time (e.g., before the establishment of the bearer channel, after the establishment of the bearer channel), etc.

As mentioned above, the header compression policy information may identify one or more conditions regarding traffic attributes, and information identifying whether to perform header compression on traffic when these conditions are met. In some implementations, the header compression policy information may be in the form of one of one or more data structures, such as example data structures 412, 426, 432, and/or another data structure.

Process 800 may further include inspecting traffic associated with the bearer channel to identify traffic attributes (block 810). For instance, once the bearer channel is established, base station 105 may send and/or receive traffic via the bearer channel (e.g., to and/or from user device 110). Base station 105 may identify traffic attributes associated with some or all of the traffic by analyzing content of packets associated with the traffic. In other words, base station 105 may identify traffic attributes associated with traffic that is processed by base station 105 (e.g., traffic that has been received by base station 105, and/or traffic that is to be sent by base station 105).

In some implementations, base station 105 may perform a deep packet inspection technique in order to identify the traffic attributes. For instance, base station 105 may identify traffic attributes based on header information associated with packets, and/or based on payload information associated with packets. As mentioned above, such attributes may include, for example, information include information regarding, for example, packet size, source and/or destination addresses (and/or a range of addresses), source and/or destination port numbers (and/or a range of port numbers), traffic protocol, user device type, payload content type, and/or one or more other packet attributes.

Figure 9:
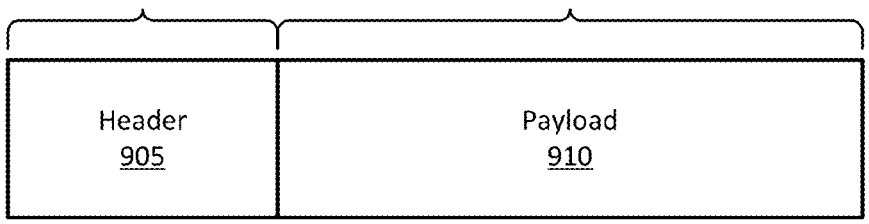
FIG. 9 illustrates an example of applying header compression policy based on packet attributes, according to one or more implementations described herein.

For instance, as shown in FIG. 9, assume that base station 105 identifies packet 900, which may be associated with the bearer channel for which information regarding a header compression policy was received identified at block 805. Base station 105 may, in some implementations, use deep packet or another technique to analyze header 905 and/or payload 910, in order to identify attributes associated with packet 900. Base station 105 may identify, based on information in header 905, that a source IP address associated with packet 900 is 1.2.3.4, that a destination IP address associated with packet 900 is 1.2.3.7, and that a protocol associated with packet 900 is RTP. Base station 105 may further identify, based on analyzing payload 910, that the payload size is 1,018 bytes.

Process 800 may additionally include identifying, based on the traffic attributes and the header compression policy, whether header compression should be performed on traffic associated with the bearer channel (block 815). For example, base station 105 may identify whether header compression should be performed on traffic associated with the bearer channel based on one or more of the attributes identified at block 810 and/or some or all of the header compression policy information received at block 805.

For example, assume that the header compression policy information received at block 805 corresponds to the information stored in data structure 432, shown in FIG. 4D. Further, assume that base station 105 is configured to analyze data structure 432 in a node-left-right order. Continuing with the above example with respect to FIG. 9, base station 105 may identify, based on information from payload 910, that the packet size (e.g., payload size, in this example) of packet 900 is less than 1,024 bytes (i.e., that the condition specified in node 434 of data structure 432 is met). Base station 105 may also identify that the source IP address associated with packet 900, 1.2.3.4, matches the condition specified in node 436 of data structure 432. Base station 105 may also identify that the protocol associated with packet 900, RTP, matches the condition specified in node 438 of data structure 432. Base station 105 may further identify that the destination IP address, 1.2.3.7, matches the condition specified in node 440 of data structure 432 (i.e., the destination IP address of packet 900 is not 1.2.3.6).

Since the identified attributes of packet 900 match the conditions associated with the header compression policy (e.g., conditions specified in example data structure 432), base station 105 may identify that header compression should be performed on packet 900. In some implementations, base station 105 may identify that header compression should be performed on all traffic (e.g., all packets) transmitted via the bearer channel, associated with packet 900. That is, in some implementations, based on the identified attributes of a single packet, base station 105 may identify whether header compression should be performed on a bearer channel, associated with the packet.

In some implementations, base station 105 may identify that header compression should be performed on traffic associated with a bearer channel, based on identifying attributes of multiple packets associated with the bearer channel (e.g., the first 10 packets transmitted via the bearer channel, the first 100 packets transmitted via the bearer channel, and/or another quantity of packets transmitted via the bearer channel). In some of these implementations, base station 105 may forgo analyzing traffic associated with a bearer channel after identifying whether header compression should be performed on traffic associated with the bearer channel.

In some implementations, base station 105 may periodically (e.g., every minute, every hour, every day, every 100 packets transmitted, every 1,000 packets transmitted, every 1,000,000 packets transmitted, any other period of time, and/or at any other interval that is based on quantity of packets transmitted) analyze traffic associated with the bearer channel in order to determine whether header compression should be performed on traffic associated with the bearer channel. For example, in some such implementations, base station 105 may identify that header compression should be performed on traffic associated with the bearer channel when at least a threshold quantity and/or proportion of the analyzed packets match traffic attributes specified by a header compression policy.

For instance, assume that base station 105 analyzes 10 packets associated with a particular bearer channel. Further, assume that 9 out of the 10 packets (i.e., 90%) match conditions specified by a particular header compression policy. Additionally, assume that the threshold proportion is 80%. In this scenario, base station 105 may determine that header compression should be performed on traffic associated with the particular bearer channel, as the attributes of 90% of the analyzed packets match the attributes specified by the header compression policy.

In some implementations, base station 105 may analyze individual packets in order to determine whether header compression should be performed on the individual packets. In other words, in some such implementations, base station 105 may determine, packet by packet, whether to perform header compression on traffic associated with a particular bearer channel.

If, based on the identifying performed at block 820, header compression is to be performed (block 825—YES), then process 800 may include applying header compression to traffic associated with the bearer channel (block 825). For instance, in the above example, base station 105 may identify that header compression should be performed on the traffic inspected at block 810. Base station 105 may use any header compression technique to compress one or more headers associated with the identified traffic, such as robust header compression ("RoHC"), and/or another header and/or data compression technique.

For example, as shown in FIG. 9, base station 105 may generate packet 915 by applying header compression to packet 900 (e.g., a packet identified as being associated with traffic for which header compression should be performed). In some implementations, packet 915 may include the same payload 910 as included in packet 900. As shown in FIG. 9, the header associated with packet 915 may be compressed header 920, which may replace an original header of packet 900 (e.g., header 905). In some implementations, compressed header 920 may be logically smaller than (e.g., may include less data than) header 905. Thus, packet 915 may be considered to be a version of packet 900, with header compression applied. Base station 105 may transmit packet 915 to user device 110 in lieu of transmitting packet 900, thus consuming less bandwidth than would have been consumed by transmitting packet 900.

In some implementations, base station 105 may use the information, identifying whether header compression should be performed on traffic associated with a bearer channel (identified at block 815), to decompress traffic, received via the bearer channel, from user device 110. Additionally, or alternatively, base station 105 may use other information (e.g., header information in the traffic) to decompress the traffic, received via the bearer channel, from user device 110.

If, on the other hand, based on the identifying performed at block 820, header compression is not to be performed (block 825—NO), then process 800 may include forgoing applying header compression to traffic associated with the bearer channel (block 830). For instance, base station 105 may, in some implementations, output such traffic to user device 110 without performing header compression on the traffic.

As mentioned above, the above description of process 800 provides an example where base station 105 performs process 800. In some implementations, user device 110 may perform some or all of process 800 in addition to, or in lieu of, base station 105. For example, in some implementations, user device 110 may receive information regarding a header compression policy associated with a bearer channel (block 805). As discussed above with respect to FIGS. 6 and 7, user device 110 may receive this information from one or more sources, such as base station 105, and/or one or more other sources.

In some implementations, user device 110 may inspect traffic associated with the bearer channel to identify attributes of the traffic (block 810). User device 110 may additionally identify, based on the attributes of the traffic (identified at block 810) and the header compression policy information (received at block 805), whether header compression should be performed on traffic associated with the bearer channel (block 815). User device 110 may further apply header compression (at block 825) or forgo applying header compression (at block 830) based on identifying whether header compression should be performed on the traffic (at block 815).

The device(s) and processes described may compress header information associated with traffic, based on one or more header compression policies. Attributes specified by a header compression policy may include, for example, packet size, source and/or destination address (and/or range of addresses), source and/or destination port number (and/or range of ports), traffic protocol, user device type, and/or one or more other packet attributes. In some implementations, a component device of a network may analyze contents of a packet (e.g., may analyze a header and/or a payload of a packet) to identify whether to apply header compression to the packet and/or to other packets associated with a bearer channel on which the packet is transmitted.

By performing header compression based on contents of a packet, one or more implementations may allow more dynamic header compression policies than existing techniques which may not perform header compression based on contents of a packet. Such policy-based header compression may allow a network service provider to finely tune header compression policies, which may result in reduced resource consumption (e.g., network bandwidth and/or processing power), thus yielding a lower overall cost of network operation.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 8, the order of the blocks may be modified in other implementations. Further, non-dependent blocks may be performed in parallel. It will be apparent that implementations, as described above, may be implemented in many different forms of software, firmware, and hardware in the implementations illustrated in the figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   identifying, by one or more processors of one or more devices, a request for a bearer channel between a user device and a base station;
   identifying, based on the request and by one or more processors of the one or more devices, one or more attributes of the bearer channel;
   receiving, by the one or more devices, information correlating a set of conditions regarding bearer channel attributes to a set of header compression policies;
   determining, based on the identified one or more attributes of the bearer channel and by one or more processors of the one or more devices, that a particular condition, of the set of conditions, is satisfied;
   identifying, by one or more processors of the one or more devices, a particular header compression policy, of the set of header compression policies, associated with the particular condition;
   storing, by one or more processors of the one or more devices, information identifying that the bearer channel is associated with the particular header compression policy;
   identifying, by one or more processors of the one or more devices, traffic that is to be sent via the bearer channel;
   determining, based on the particular header compression policy and by one or more processors of the one or more devices, that header compression should be performed on the traffic;
   generating, based on determining that the header compression should be performed and by one or more processors of the one or more devices, header-compressed traffic by performing the header compression on the traffic; and
   outputting, by the one or more devices, the generated header-compressed traffic.

2. The method of claim 1, where the particular header compression policy includes information identifying one or more conditions regarding one or more traffic attributes.

3. The method of claim 2, where the one or more traffic attributes include information regarding at least one of:
   a source address,
   a destination address,
   a source port,
   a destination port,
   a protocol, or
   a size of one or more packets.

4. The method of claim 1, where the one or more bearer channel attributes include information regarding at least one of:
   a quality of service level associated with the bearer channel,
   an identifier of a user device associated with the request for the bearer channel,
   a type of the user device, or
   an identifier of an application associated with the request for the bearer channel.

5. The method of claim 1, where identifying the traffic that is to be sent via the bearer channel includes identifying a particular packet that is to be sent via the bearer channel;
   where determining that the header compression should be performed on the traffic includes determining that the header compression should be performed on the particular packet;
   where generating the header-compressed traffic includes performing the header compression on the particular packet to generate a header-compressed packet; and
   where outputting the generated header-compressed traffic includes outputting the header-compressed packet.

6. The method of claim 5, where the particular packet includes a first header and a first payload,
   where the header-compressed packet includes a second header and a second payload,
   where the second header is based on the first header and the second payload is based on the first payload, and
   where a size of the second header is smaller than a size of the first header.

7. The method of claim 1, where the one or more devices include a base station.

8. A system, comprising:
   one or more devices to:
      identify a request for a bearer channel between a user device and a base station;
      identify, based on the request, one or more attributes of the bearer channel;
      receive information correlating a set of conditions regarding bearer channel attributes to a set of header compression policies;
      determine, based on the identified one or more attributes of the bearer channel, that a particular condition, of the set of conditions, is satisfied;
      identify a particular header compression policy, of the set of header compression policies, associated with the particular condition;
      store information identifying that the bearer channel is associated with the particular header compression policy;

identify traffic that is to be sent via the bearer channel;
determine, based on the particular header compression policy, that header compression should be performed on the traffic;
generate, based on determining that the header compression should be performed, header-compressed traffic by performing the header compression on the traffic; and
output the generated header-compressed traffic.

9. The system of claim 8, where the particular header compression policy includes information identifying one or more conditions regarding one or more traffic attributes.

10. The system of claim 9, where the one or more traffic attributes include information regarding at least one of:
a source address,
a destination address,
a source port,
a destination port,
a protocol, or
a size of one or more packets.

11. The system of claim 8, where the one or more bearer channel attributes include information regarding at least one of:
a quality of service level associated with the bearer channel,
an identifier of a user device associated with the request for the bearer channel,
a type of the user device, or
an identifier of an application associated with the request for the bearer channel.

12. The system of claim 8, where, when identifying the traffic that is to be sent via the bearer channel, the one or more devices are to identify a particular packet that is to be sent via the bearer channel;
where, when determining that the header compression should be performed on the traffic, the one or more devices are to determine that the header compression should be performed on the particular packet;
where, when generating the header-compressed traffic, the one or more devices are to perform the header compression on the particular packet to generate a header-compressed packet; and
where, when outputting the generated header-compressed traffic, the one or more devices are to output the header-compressed packet.

13. The system of claim 12, where the particular packet includes a first header and a first payload,
where the header-compressed packet includes a second header and a second payload,
where the second header is based on the first header and the second payload is based on the first payload, and
where a size of the second header is smaller than a size of the first header.

14. The system of claim 8, where the one or more devices include a base station.

15. A non-transitory computer-readable medium storing instructions, the instructions comprising:
one or more instructions which, when executed by one or more processors of one or more devices, cause the one or more processors to:
identify one or more attributes of a bearer channel;
receive information correlating a set of conditions regarding bearer channel attributes to a set of header compression policies;
determine, based on the one or more attributes of the bearer channel, that a particular condition, of the set of conditions is satisfied;
identify a particular header compression policy, of the set of header compression policies, associated with the particular condition;
identify one or more attributes of traffic processed by the one or more devices, the one or more attributes including information regarding at least one of:
a source address,
a destination address,
a source port,
a destination port,
a protocol, or
a size of one or more packets;
receive policy information that indicates one or more traffic attributes;
determine that at least one of the one or more attributes of the processed
traffic matches a particular set of traffic attributes, of the one or more
traffic attributes, indicated by the policy information; and
perform header compression on the processed traffic based on the determining that the at least one of the one or more attributes of the processed traffic matches the particular set of traffic attributes.

16. The non-transitory computer-readable medium of claim 15, where the processed traffic includes at least one of:
traffic that is received by the one or more devices, or
traffic that is to be output by the one or more devices.

17. The non-transitory computer-readable medium of claim 15, where the processed traffic includes a first packet that includes a first header and a first payload,
where the one or more instructions which, when executed by the one or more processors, cause the one or more processors to perform the header compression on the processed traffic, further cause the one or more processors to:
generate a second packet that includes a second header and a second payload,
where the second header is based on the first header and the second payload is based on the first payload, and
where the second header is logically smaller than the first header.

18. The non-transitory computer-readable medium of claim 15, where the policy information indicates an order in which to analyze the one or more traffic attributes, and
where the one or more instructions which, when executed by the one or more processors, cause the one or more processors to determine that at the least one of the one or more attributes of the processed traffic matches the particular set of traffic attributes, of the one or more traffic attributes indicated by the policy information, further cause the one or more processors to:
compare the at least one of the one or more attributes to the one or more traffic attributes indicated by the policy information in an order that is based on the order indicated by the policy information.

19. The non-transitory computer-readable medium of claim 15, where the one or more traffic attributes indicated by the policy information include information regarding at least one of:
a range of two or more source addresses,
a range of two or more destination addresses,
a range of two or more source ports,
a range of two or more destination ports,
two or more protocols, or
a range of packet sizes.

20. The non-transitory computer-readable medium of claim 15, where the processed traffic is associated with the bearer channel, and
where the one or more instructions which, when executed by the one or more processors, cause the one or more processors to perform the header compression on the processed traffic, further cause the one or more processors to:
perform the header compression on other traffic that is associated with the bearer channel without determining whether attributes of the other traffic match traffic attributes indicated by the policy information.

* * * * *